July 8, 1958
R. L. KENNEDY
2,842,091
TRUE AIRSPEED INDICATOR
Filed July 26, 1957
2 Sheets-Sheet 1
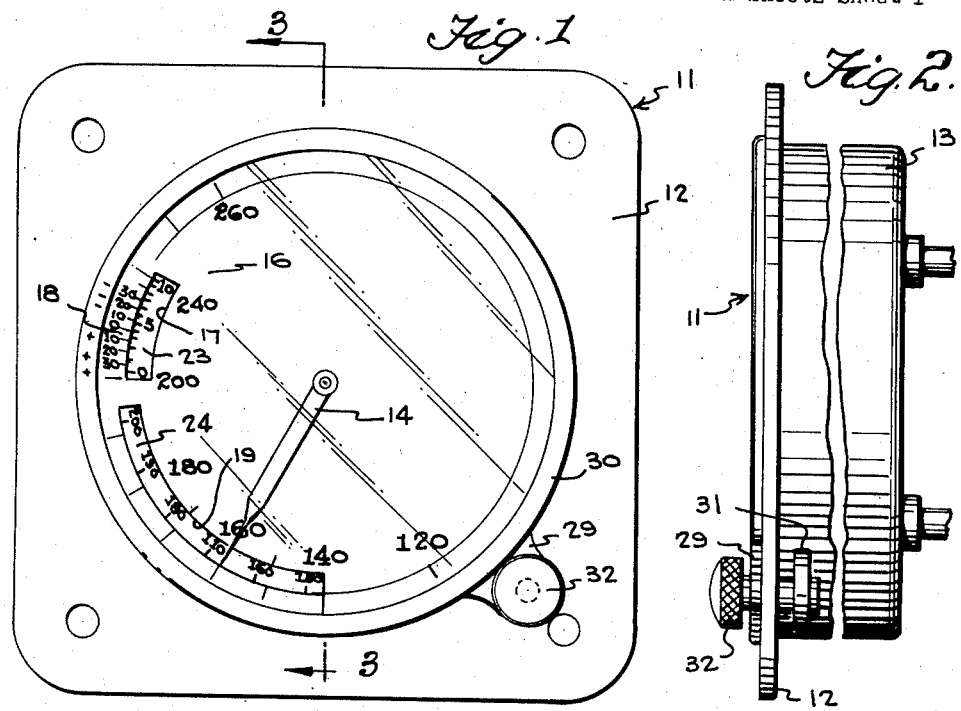
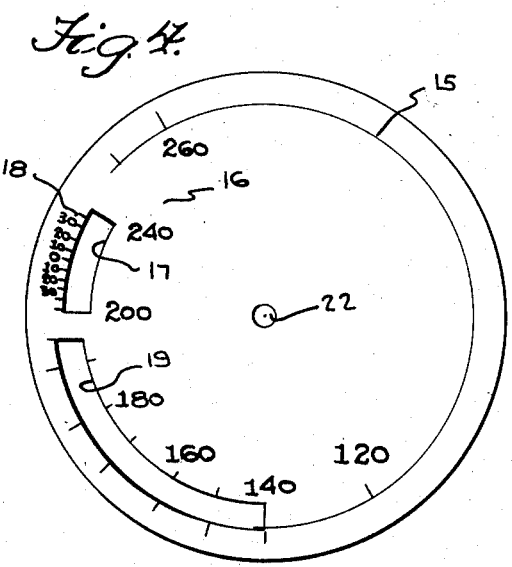
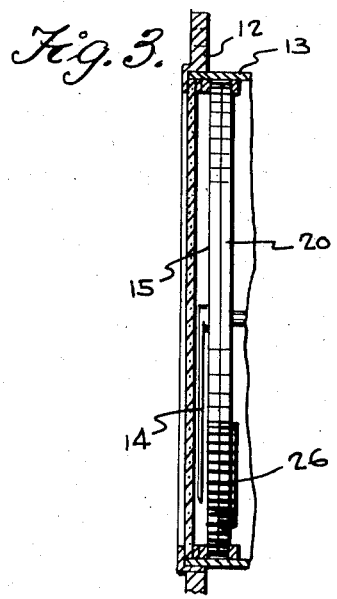
INVENTOR.
Ronald L. Kennedy,
BY
McMorrow, Berman & Davidson
ATTORNEYS July 8, 1958  R. L. KENNEDY  2,842,091
TRUE AIRSPEED INDICATOR
Filed July 26, 1957  2 Sheets-Sheet 2
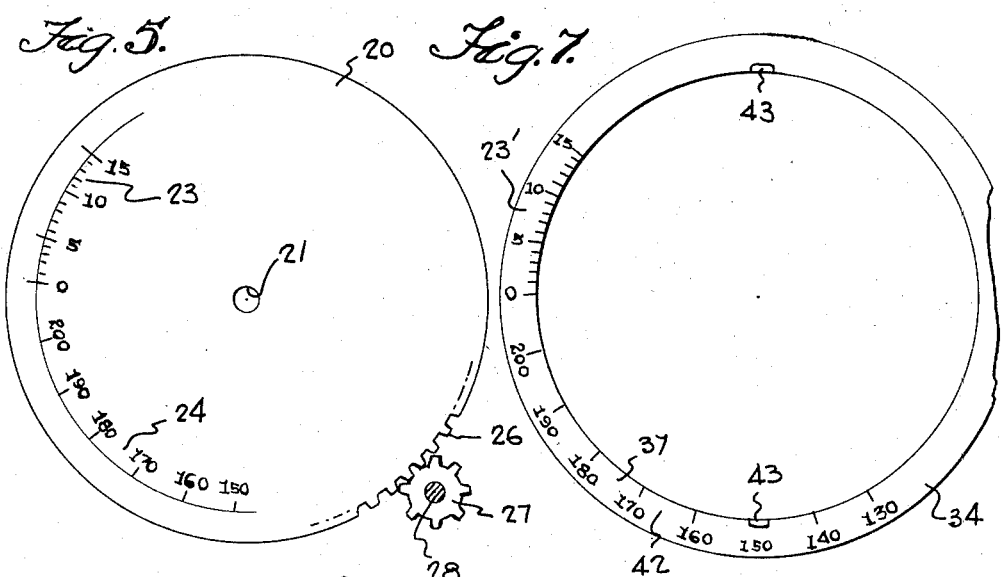
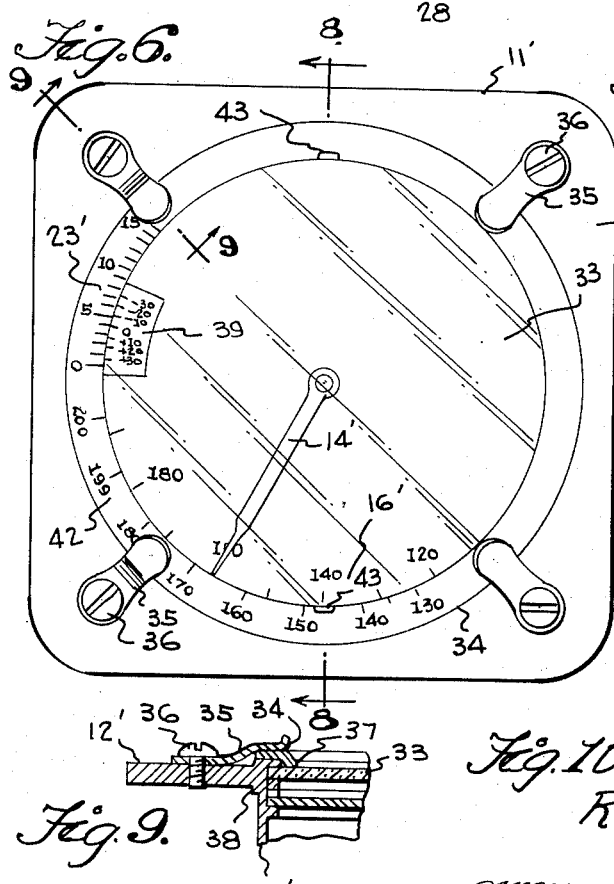
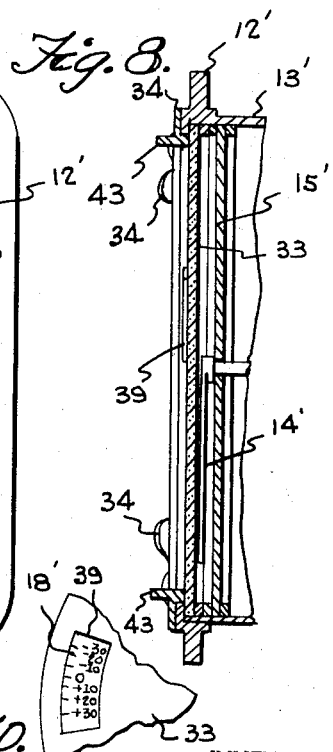
INVENTOR.
Ronald L. Kennedy
BY
McMorrow, Berman & Davidson
ATTORNEYS

United States Patent Office 2,842,091
Patented July 8, 1958

2,842,091

TRUE AIRSPEED INDICATOR

Ronald L. Kennedy, Erie, Pa.

Application July 26, 1957, Serial No. 674,422

2 Claims. (Cl. 116—129)

This invention relates to airspeed indicators for use on aircraft, and more particularly to an airspeed indicator provided with means for accurately compensating for the effects of temperature and altitude.

The main object of the invention is to provide a novel and improved true airspeed indicator for aircraft, said indicator being simple in construction, involving inexpensive parts, and being easy to operate, whereby true airspeed may be rapidly found by setting the device in accordance with observed temperature and altitude conditions of the aircraft.

A further object of the invention is to provide an improved true airspeed indicator for use on an aircraft having conventional apparent airspeed indicating means of the type provided with a circular dial and a pointer rotatably mounted for angular movement around the center of the dial, the true airspeed indicating attachment being easy to install, being arranged so that it does not interfere with normal observation of the pointer of the instrument, and being arranged so that it may rapidly be set in accordance with observed temperature and altitude conditions to provide the required correction to establish the true airspeed of the aircraft.

Further objects and advantages of the invention will become apparent from the following description and claims, and from the accompanying drawings, wherein:

Figure 1 is a front elevational view of a true airspeed indicating instrument constructed in accordance with the present invention, arranged as a complete unit to be installed on the instrument panel of an aircraft.

Figure 2 is a fragmentary side elevational view of the true airspeed indicating instrument of Figure 1.

Figure 3 is a fragmentary vertical cross sectional view taken substantially on the line 3—3 of Figure 1.

Figure 4 is a front elevational view of the stationary dial portion of the instrument of Figures 1, 2 and 3.

Figure 5 is a front elevational view of the rotatable dial portion of the instrument of Figures 1, 2 and 3 and showing the driving pinion associated therewith.

Figure 6 is a front elevational view of an aircraft speed indicating instrument provided with a true airspeed indicating attachment according to the present invention and employing the same principles as the instrument shown in Figures 1 to 5.

Figure 7 is a fragmentary front elevational view of a rotatable true airspeed scale ring employed in Figure 6.

Figure 8 is a fragmentary vertical cross sectional view taken on the line 8—8 of Figure 6.

Figure 9 is an enlarged cross sectional detail view taken on the line 9—9 of Figure 6.

Figure 10 is a fragmentary view of a portion of a glass dial cover employed in Figure 6 and provided with a temperature scale adapted to be used in conjunction with the altitude scales provided on the rotatable ring member therein.

Referring to the drawings, and more particularly to Figures 1 to 5, 11 generally designates an airspeed indicating instrument operated in a generally conventional manner, said instrument comprising a front supporting plate 12 to which is secured a cylindrical housing 13 which contains conventional aircraft speed-responsive mechanism of the air pressure-responsive type, said mechanism being arranged to rotate a pointer 14 around the center of a main dial 15 relative to a speed scale 16. The speed scale 16 is calibrated to be read directly by the mechanism and is of a conventional nature, the mechanism itself having no means for compensating for the effects of temperature or of altitude of the aircraft.

Heretofore, in employing an airspeed indicator having this type of mechanism, it was necessary for the navigator or for other personnel associated with the aircraft to make relatively tedious computations in order to properly correct the indicated airspeed shown by the pointer 14 on the scale 16, so as to obtain a value giving the true airspeed. As will be subsequently described, the present invention provides a means for making these computations in an easy and convenient manner and makes it instantly possible to observe the true airspeed of the aircraft from the position of the rotary pointer 14.

The stationary dial 15 is formed with an arcuate slot adjacent its periphery, said slot being shown at 17, the slot being provided at one side edge thereof with a temperature scale 18. Stationary dial 15 is further formed with another arcuate slot 19 of substantial length, located adjacent the periphery of the dial, both of the slots 19 and 17 having common centers, and being concentric with dial 15.

Designated at 20 is a circular dial member which is rotatably mounted in the instrument housing 13 immediately behind the stationary dial 15, said dial 15 being of opaque material. Thus, the rotatable dial 20 may be mounted on an axis which is the same as that of the stationary dial 15, the axis comprising, for example, a sleeve or shaft extending through the rotatable dial 20 and the stationary dial 15, suitable central apertures 21 and 22 being provided for same in the dials 20 and 15. The rotatable dial 20 may be thus rotatably supported on said sleeve or shaft.

The rotatable dial 20 is provided with an altitude scale 23 arcuately arranged concentric with the circular dial 20 and located so as to be visible through the arcuate slot 17 of the stationary dial 15. The rotatable dial 20 is further provided with a true airspeed scale 24 arranged arcuately, concentrically with the circular dial 20 and located so as to be visible through the arcuate slot 19 of stationary dial 15. The temperature scale 18 and the altitude scale 23 are suitably calibrated, so that when the zero point on the altitude scale 23 is moved to a position corresponding to the value of observed temperature on the scale 18, the position of pointer 14 will be compensated for temperature, at that particular altitude and the altitude scale 23 is arranged so that when the 15° C. point on temperature scale 18 is located adjacent the value of observed altitude on scale 23, the true airspeed scale 24 will be adjusted so that the pointer 14 will be compensated for observed altitude conditions of the aircraft at that particular temperature. Thus, if the rotary scale 20 is adjusted so that the observed altitude value on scale 23 is disposed adjacent to the observed temperature value on the scale 18, the pointer 14 will be compensated for both observed temperature and observed altitude.

As shown in Figure 1, the true airspeed scale 24 is visible through the arcuate slot 19, and the pointer 14 extends not only over the apparent airspeed scale 16 but also over the portion of the true airspeed scale 24 visible through the slot 19. Thus, when the rotatable dial 20 is adjusted to place the observed values of altitude and temperature, on respective scales 23 and 18, adjacent each other, as noted through the arcuate slot 17, the pointer 14 will show the true airspeed on the portion of scale 24 visible through the slot 19. At the same time, pointer 14 will also indicate the apparent airspeed from the scale 16 on the stationary dial 15.

Any suitable means may be provided for rotating the circular dial 20 to adjust same. For example, the dial 20 may be provided on its periphery with the gear teeth 26, and a pinion member 27 may be secured on a shaft 28 rotatably mounted on a lug 29 provided at the lower side portion of housing 13.

For example, as shown in Figures 1 and 2, the lug 29 may be integrally formed on the circular front flange 30, defining a thickened portion at the lower right side of flange 30 which serves as a bearing for the shaft 28. The pinion 27, secured on the inner end of the shaft, extends through a slot 31 in the lower side portion of the housing 13 and meshingly engages with the gear teeth 26 on the periphery of the rotatable dial 20. An operating knob 32 is secured on the front end of the shaft 28, whereby the dial 20 may be adjusted in the manner above described by rotating the knob 32.

The altitude scale 23 is calibrated in any suitable manner, for example, in calibration units representing thousands of feet. The temperature scale 18 is calibrated in a conventional manner, for example, in degrees centigrade.

Referring now to Figures 6 to 10, 11' designates a conventional airspeed indicator of the uncompensated type, comprising a supporting flange 12' to which is secured the housing 13' containing a conventional speed-responsive mechanism of the same general type as employed in the instrument illustrated in Figures 1 to 5, but having a stationary speed-indicating dial 15' and a rotatable pointer 14' which rotates axially around the center of the dial 15' and moves past an airspeed scale 16', thus showing apparent airspeed. The instrument 11' is provided with a transparent front cover 33 of glass, or other suitable transparent material.

Designated at 34 is a calibrated ring member which is of sufficient diameter to circumscribe the circular front cover 33, and is rotatably mounted around said front cover concentrically therewith in any suitable manner, for example, by rotatably supporting same in inwardly extending spring clips 35 secured around the ring member to the flange 12'. As shown in Figure 9, each spring clip 35 is fastened at its outer end to the flange 12' by a machine screw 36 extending through an aperture in the spring clip and threadedly engaged in flange 12'. The inner end of the spring clip overlies the calibrated ring member 34 and frictionally holds said ring member against rotation, however, being yieldable when the ring member is manually rotated. The ring member 34 is formed with the annular, inwardly extending flange 37 which engages over the annular peripheral flange 38 provided on the flange 12', serving as a stop means for the glass cover 33 and retaining same in covering relationship to the instrument housing 13'. Thus the ring member 34 is centered by its inner annular flange 37 and is held on the annular rib 38 by the spring clips 35, being rotatable when sufficient torque is exerted thereon to overcome the frictional force of the spring clips.

As shown in Figure 6, four spring clips 35 may be employed, located approximately at 90° angles to each other.

The ring member 34 is provided with a calibrated altitude scale 23' identical to the altitude scale 23 on the rotatable disc 20 in the previously described form of the invention, and located at the inner periphery of the ring member, as shown in Figure 6. Designated at 39 is an arcuate decalcomania strip which is fastened on the transparent cover 33 adjacent the scale 23', said strip 39 being provided with a temperature scale 18' similar to the scale 18 on the stationary dial 15 in the previously described form of the invention. The temperature scale on the strip 39, designated at 18', is located adjacent to the scale 23' and is spaced in the same manner as previously described with respect to the scales 18 and 23, so that by rotating the ring member 34 to place the observed value of altitude of scale 23' adjacent the observed value of temperature of scale 18', the ring member 34 will be rotated in a manner to adjust for the difference between apparent airspeed, as indicated by pointer 14' on the scale 16' and true airspeed as indicated on an airspeed scale 42 provided on the ring member 34.

Thus, in installing the decalcomania strip 39 on the transparent cover 33, said strip may be placed on the cover 33 at a position corresponding to known conditions of temperature, altitude and true airspeed which can be easily determined and established as standard procedure for installing the compensating attachment illustrated in Figures 6 to 10. Thus, indicated air speed and true air speed are exactly the same in a standard atmosphere (i. e., 59° F. or 15° C. at sea level at a pressure of 29.92 inches of mercury). Therefore, in mounting the decalcomania strip 39, the ring member 34 is rotated so that the speed scale on ring member 34 is perfectly aligned with the indicated air speed scale on the dial 15'. The decalcomania strip 39 is then fastened on the cover 33 so that the 15° C. mark on the scale 18' is aligned with the zero altitude mark on the ring scale 23'.

In using the attachment, the ring 34 is manually rotated, as above mentioned, to place the observed value of altitude on the scale 23' adjacent to the observed value of temperature on the scale 18'. The pointer 14' will then indicate the true airspeed on the scale 42 of the ring member, as well as the apparent airspeed on the scale 16' of the instrument dial 15'.

The inner peripheral portion of the ring member 34 may be provided at spaced points thereon with suitable outwardly projecting lugs 43 which may be employed as finger grip elements for manually rotating the ring member 34 against the frictional force of the spring clips 35. Thus, two diametrically opposed lugs 43 may be provided on the ring member for this purpose.

While certain specific embodiments of an aircraft true airspeed indicator have been disclosed in the foregoing description. It will be understood that various modifications within the spirit of the invention may occur to those skilled in the art. Therefore, it is intended that no limitations be placed on the invention except as defined by the scope of the appended claims.

What is claimed is:

1. In an aircraft airspeed indicator, a circular stationary main dial provided with an airspeed scale at its margin, a pointer rotatably mounted for angular movement around the center of said main dial, a movable dial rotatably mounted adjacent said main dial concentrically therewith, a true airspeed scale on said movable dial, and respective temperature and altitude scales mounted on said dials and located adjacent each other, said temperature and altitude scales being formed and arranged so that observed values of temperature and altitude may be aligned with each other responsive to rotation of said movable dial whereby to angularly adjust said true airspeed scale relative to said first-named airspeed scale, said true airspeed scale being calibrated to provide a corrected air speed indication relative to said stationary main dial in accordance with said aligned temperature and altitude values.

2. In an aircraft airspeed indicator, a stationary circular main dial provided with an airspeed scale at its margin, a pointer rotatably mounted for angular movement around the center of said main dial, a movable dial rotatably mounted adjacent the margin of the main dial concentrically therewith, a true airspeed scale on said movable dial, a temperature scale on the marginal portion of said stationary dial, and an altitude scale on said movable dial located adjacent said temperature scale, said temperature and altitude scales being formed and arranged so that when the movable dial is rotated to align the observed altitude and temperature values with each other, the true airspeed scale will be adjusted angularly relative to the first-named airspeed scale, said true airspeed scale being calibrated to provide corrected airspeed indications relative to said stationary main dial in accordance with respective sets of aligned observed temperature and altitude values.

References Cited in the file of this patent

UNITED STATES PATENTS

| | | |
|---|---|---|
| 2,174,608 | Vail | Oct. 3, 1939 |
| 2,217,564 | Scriba | Oct. 8, 1940 |
| 2,251,498 | Schivien | Aug. 5, 1941 |
| 2,318,153 | Gilson | May 4, 1943 |
| 2,706,407 | Hosford | Apr. 19, 1955 |